(12) United States Patent
Gorell et al.

(10) Patent No.: US 9,285,500 B2
(45) Date of Patent: Mar. 15, 2016

(54) METHODS AND SYSTEMS OF MODELING HYDROCARBON FLOW FROM LAYERED SHALE FORMATIONS

(75) Inventors: Sheldon B. Gorell, Katy, TX (US); Kenneth E. Williams, Houston, TX (US); Amit Kumar, Houston, TX (US); Ronald G. Dusterhoft, Katy, TX (US)

(73) Assignee: LANDMARK GRAPHICS CORPORATION, Houston, TX (US)

(*) Notice: Subject to any disclaimer, the term of this patent is extended or adjusted under 35 U.S.C. 154(b) by 0 days.

(21) Appl. No.: 13/883,963

(22) PCT Filed: Apr. 18, 2012

(86) PCT No.: PCT/US2012/034063
§ 371 (c)(1),
(2), (4) Date: May 7, 2013

(87) PCT Pub. No.: WO2013/158089
PCT Pub. Date: Oct. 24, 2013

(65) Prior Publication Data
US 2014/0136172 A1    May 15, 2014

(51) Int. Cl.
G06G 7/48 (2006.01)
G01V 9/00 (2006.01)
G01V 99/00 (2009.01)
E21B 43/17 (2006.01)

(52) U.S. Cl.
CPC .............. *G01V 9/00* (2013.01); *G01V 99/005* (2013.01); *E21B 43/17* (2013.01)

(58) Field of Classification Search
CPC ...................................................... E21B 43/17
USPC .......................................................... 703/10
See application file for complete search history.

(56) References Cited

U.S. PATENT DOCUMENTS

| 7,615,741 | B2 | 11/2009 | Jacobi et al. |
| 2003/0070480 | A1 | 4/2003 | Herron et al. |
| 2003/0178191 | A1 | 9/2003 | Maher et al. |
| 2006/0005968 | A1 | 1/2006 | Vinegar et al. |
| 2007/0259183 | A1 | 11/2007 | Knobloch |

(Continued)

FOREIGN PATENT DOCUMENTS

WO    2012-030426 A1    3/2012

OTHER PUBLICATIONS

Abdallah et al.; Fundamentals of Wettability; Oilfield Review; pp. 44-61; 2007.*

(Continued)

*Primary Examiner* — Hugh Jones

(57) ABSTRACT

Modeling hydrocarbon flow, from layered shale formations. At least some of the illustrative embodiments are methods including: modeling movement of hydrocarbons through kerogen-related porosity, the movement through a first model volume; estimating a first permeability of a kerogen-rich layer of a layered shale formation based on the modeling; and modeling hydrocarbon production from the layered shale formation. The modeling hydrocarbon production may include: utilizing the first permeability for the kerogen-rich layer of the layered shale formation; and utilizing a second permeability for a kerogen-poor layer of the layered shale formation, the second permeability different than the first permeability. In various cases the modeling of hydrocarbon production is with respect to a second model volume greater than the first model volume.

29 Claims, 7 Drawing Sheets

(56) References Cited

U.S. PATENT DOCUMENTS

2010/0228485 A1 9/2010 Betancourt et al.
2010/0250215 A1 9/2010 Kennon et al.

OTHER PUBLICATIONS

Ticora Geosciences: Final Report Reservoir Property Analysis (report); 2005; 112 pages.*
Lewis et al.; New Evaluation Techniques for Gas Shale Reservoirs; Reservoir Symposium 2004; pp. 1-11.*
Buller et al.; Petrophysical Evaluation for Enhancing Hydraulic Stimulation in Horizontal Shale Gas Wells; SPE 132990; Sep. 2010; pp. 1-21.*
Olarewaju et al.; New Pressure-Transient Analysis Model for Dual-Porosity Reservoirs; SPE Formation Evaluation, SPE 15634; Sep. 1989; pp. 384-390.*
Passey et al.; From Oil-Prone Source Rock to Gas-Producing Shale Reservoir—Geologic and Petrophysical Characterization of Unconventional Shale-Gas Reservoirs, SPE 131350; Jun. 2010; pp. 1-29.*
Kucuk et al.; Transient Flow in Naturally Fractured Reservoirs and Its Application to Devonian Gas Shales; SPE 9397; 55th Annual Fall AIME; 1980; pp. 1-11.*
Barenblatt et al. "Basic Concepts in the Theory of Seepage of Homogeneous Liquids in Fissured Rocks (Strata)," PPM (1960) 24(5) 1286-1303.*
Choi et al.: A new dual-porosity/dual-permeability model with non-Darcian flow through fractures; Journal of Petroleum Science and Engineering 17 (1997) 331-344.*
Warren and Root: The behavior of naturally fractured reservoirs. Society of Petroleum Engineers Journal, 3 (3), 1963; pp. 245-255.*
Pirson: Perormance of fractured oil reservoirs. AAPG Bulletin; vol. 37, No. 2. 1953; one page—abstract.*
Barenblatt 1960 On the basic equations of the filtration of homogeneous fluids in fissurized rocks. Dokl. Akad. Nauk. USSR, 132, 545; 1960; pp. 1286-1303.*
Buckles et al. (Toward Improved Prediction of Reservoir Flow Performance: simulating oil and water flows at the pore scale, 1994); Los Alamos Science No. 22 1994; pp. 112-121.*
Dixit et al.: Empirical Measures of Wettability in Porous Media and the Relationship between Them Derived From Pore-Scale Modelling; Transport in Porous Media 40: 2000; pp. 27-54.*
England et al.: The movement and entrapment of petroleum fluids in the subsurface; Journal of the Geological Society, London, vol. 144, 1987, pp. 327-347.*
Leythaeuser et al.: On the Primary Migration of Petroleum. World Petroleum Congress; 1987; pp. 227-236.*
Mann et al.: Petroleum Migration: Mechanisms, Pathways, Efficiencies and Numerical Simulations; in Petroleum and Basin Evolution; Springer-Verlag Berlin Heidelberg 1997; pp. 403-520.*
Mann: Revealing hydrocarbon migration pathways; Geologische Rundschau 78/1; Stuttgart 1989; pp. 337-348.*
Milner et al.: Imaging Texture and Porosity in Mudstones and Shales: Comparison of Secondary and Ion-Milled Backscatter SEM Methods; CSUG/SPE 138975; Oct. 19, 2010; pp. 1-10.*
Rudkiewicz et al.; Influence of kerogen type and TOC content on multiphase primary migration: Organic Geochemistry, v. 21; 1994; pp. 121-133.*
Sondergeld et al. (Petrophysical Considerations in Evaluating and Producing Shale Gas Resources); SPE 131768; Feb. 2010; pp. 1-34.*
Bowker, K.A. Recent Developments of the Barnett Shale Play, Fort Worth Basin. West Texas Geological Society Bulletin. vol. 42, No. 6, p. 4-11. 2003.
Loucks, R.G. et al. Morphology, Genesis, and Distribution of Nanometer-Scale Pores in Siliceous Mudstones of the Mississippian Barnett Shale. Journal of Sedimentary Research. vol. 79, p. 848-861. 2009.
Loucks, R.G. et al. Preliminary Classification of Matrix Pores in Mudrocks. Gulf Coast Association of Geological Societies Transactions. vol. 60, p. 435-441. 2010.
Pepper, A.S. et al. Simple Kinetic Models of Petroleum Formation. Part III: Modelling an Open System. Marine and Petroleum Geology; vol. 12, No. 4; pp. 417-452. 1995.
Shanley, K.W. Factors Controlling Prolific Gas Production from Low-Permeability Sandstone Reservoirs: Implications for Resource Assessment, Prospect Development, and Risk Analysis. The American Association of Petroleum Geologists. AAPG Bulletin; vol. 88, No. 8; pp. 1083-1121. Aug. 2004.
Modica, C.J. et al. Estimation of Kerogen Porosity in Source Rocks as a Function of Thermal Transformation: Example from the Mowry Shale in the Powder River Basin of Wyoming. AAPG Bulletin, Jan. 2012. vol. 96, No. 1, p. 87-108.
Bai et al.; Multiporosity/Multipermeability Approach to the Simulation of Naturally Fractured Reservoirs; Water Resources Research. vol. 29. No. 6; 1993; pp. 1621-1633.
Leythaeuser et al.; Pressure Solution in Carbonate Source Rocks and its Control on Petroleum Generation and Migration; Marine and Petroleum Geology, vol. 12, No. 7, 1995; pp. 717-733.
Carcione et al.; Rock Physics of Geopressure and Prediction of Abnormal Pore Fluid Pressures Using Seismic Data; CSEG Recorder Sep. 2002, pp. 8-32.
Acharya et al.; Organic Richness and Productivity Index Relationship in Dual Porosity Flow-System of Gas and Condensate Kerogen Reservoirs of Najmah Formation, North Kuwait; SPE 121811; 2009; pp. 1-9.
Ambrose, RJ et al. New Pore-Scale Considerations for Shale Gas in Place Calculations SPE 131772, Society of Petroleum Engineers. SPE Unconventional Gas Conference: Pittsburgh, Pennsylvania; Feb. 23-25, 2010; pp. 1-17.
Curtis, M.E. et al. Investigation of the Relationship Between Organic Porosity and Thermal Maturity in the Marcellus Shale. SPE 144370. Society of Petroleum Engineers. SPE North American Unconventional Gas Conference and Exhibition; The Woodlands, Texas; Jun. 14-16, 2011; pp. 1-4.
International Search Report and Written Opinion issued May 30, 2012 in International Patent Application No. PCT/US2011/057898, Filed Oct. 26, 2011 (11 pages).
International Search Report and Written Opinion issued Nov. 30, 2012 in International Patent Application No. PCT/US2012/034063, filed Apr. 18, 2012 (9 pages).

* cited by examiner

METHODS AND SYSTEMS OF MODELING HYDROCARBON FLOW FROM LAYERED SHALE FORMATIONS

CROSS-REFERENCE TO RELATED APPLICATIONS

None.

BACKGROUND

Advances in directional drilling (i.e., horizontal drilling) along with advances in hydraulic fracturing have made economical the production of oil and gas from shale formations. For future planning purposes, companies involved in oil and gas production need estimates of future production from such shale formations. In an attempt to provide such estimates of future production, the oil and gas industry has attempted to use formation modeling tools originally designed for conventional reservoirs (with high permeability). However, shale formations are vastly different than conventional reservoirs. For example, some shale formations may have 500 times less permeability than conventional reservoirs.

While it is possible to have existing formation modeling tools tuned to actual production history from a shale formation, the formation models are highly inaccurate as to future production from the shale formations.

Any advance which makes modeling of future hydrocarbon production from shale formations more accurate would provide a competitive advantage.

BRIEF DESCRIPTION OF THE DRAWINGS

For a detailed description of exemplary embodiments, reference will now be made to the accompanying drawings in which.

NOTATION AND NOMENCLATURE

Figure 1:
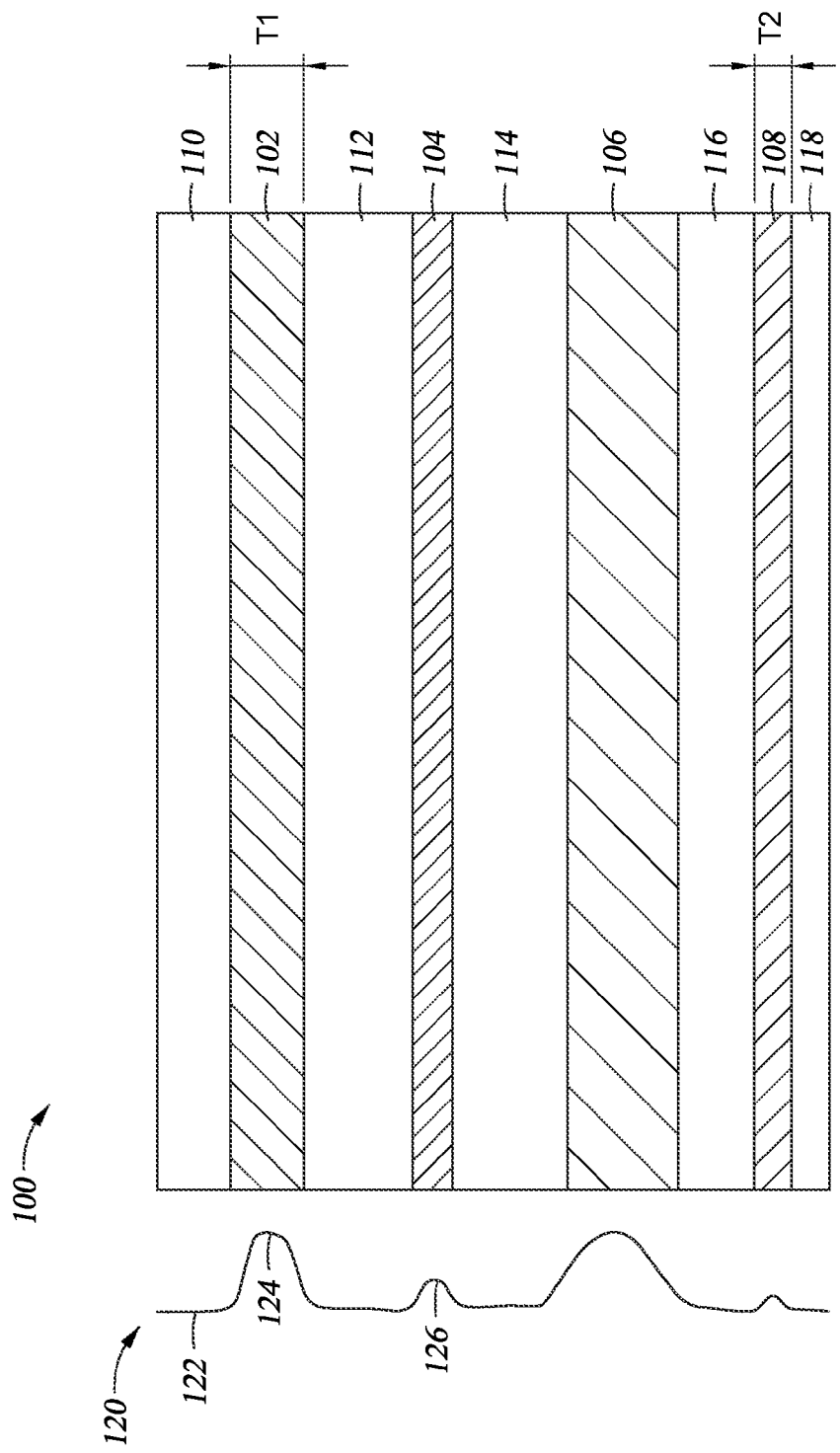
FIG. 1 shows a cross-sectional elevation view of a layered shale formation, along with a corresponding plot of total organic content.

Certain terms are used throughout the following description and claims to refer to particular components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . . " Also, the term "couple" or "couples" is intended to mean either an indirect or direct connection. Thus, if a first device couples to a second device, that connection may be through a direct connection or through an indirect connection via other devices and connections.

"Kerogen-related porosity" shall mean an indication of present-day porosity whose presence is attributed to carbon material deposited with the clay and other minerals. "Kerogen-related porosity" shall not speak to the affinity for hydrocarbons of the rock of a formation.

"Water-wet porosity" shall mean an indication of present-day porosity whose presence is attributed to water initially deposited with the sediment of the formation, but which water may not now be present. "Water-wet porosity" shall not speak to the affinity for water of the rock of a formation.

"Fracture porosity" shall mean pore spaces caused by stress fractures in the formation. The stress fractures may be caused by natural stress (such as by compaction, faulting, uplifting) as well as induced stress (such as by fracturing operations associated with a borehole).

"Layered shale formation" shall mean a sedimentary rock formation having interspersed kerogen-rich layers and kerogen-poor layers.

"Kerogen-rich layer" shall mean a layer within a layered shale formation having a total organic content of two percent (2%) or higher.

"Kerogen-poor layer" shall mean a layer within a layered shale formation having a total organic content of less than two percent (2%).

"Knudsen number" shall mean the ratio of a molecular free path length to a diameter of a flow pathway for hydrocarbons.

"Knudsen flow" shall mean a description of flow of fluids in situations where the Knudsen number is greater than 1.0.

"Transport mechanism" shall refer to a type of mathematical model used to describe fluid flow (e.g., statistical mechanics for Knudsen flow, continuum mechanics for Darcy flow).

"Model" and/or "simulate" shall refer to computer operations that take place in less time than a single person could perform the calculations using pencil and paper.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments are directed to systems and related methods of increasing the accuracy of modeling with respect to hydrocarbon production from shale formations. More particularly, shale formations in many cases comprise layering, where kerogen-rich layers are interspersed with kerogen-poor layers, and various embodiments are directed to accounting for kerogen-rich and kerogen-poor layers in prediction of future hydrocarbon production. The specification first turns to a description of layered shale formations, and creation of the various permeabilities and porosities in shale formations.

Layered Shale Formations

Shale formations are sedimentary rock created by the deposition of mud comprising flakes of clay, and other minerals, such as quartz and calcite, and that may contain organic material. Frequently, layers comprising a higher organic material content are interspersed with layers having lower organic material content. The layering of the organic material at deposition results in present day layered shale formations having interspersed kerogen-rich layers (e.g., high total organic content (TOC)) and kerogen-poor layers (e.g., low TOC)). In many cases, the thickness of a kerogen-rich layer (measured perpendicular to the layering) may only be a few feet thick or less. Likewise kerogen-poor layers may only be a few feet thick. Regardless of the layering regarding organic material, hydrocarbons are created from the organic content based on the increased pressure and increased temperature associated with deep burial history. The variability of kerogen content within an overall shale formation makes modeling of future hydrocarbon production difficult.

FIG. 1 shows a cross-sectional elevation view of a layered shale formation. In particular, the layered shale formation 100 may comprise a plurality of layers, some layers being kerogen-rich layers, and other layers being kerogen-poor layers. In the illustration of FIG. 1, four kerogen-rich layers 102, 104, 106, and 108 are shown, along with five kerogen-poor layers 110, 112, 114, 116, and 118. The types and number of kerogens within each kerogen-rich layer 102, 104, 106, and 108 may be different. For example, a predominant kerogen type found in layer 102 may be non-existent or only minimally present in layer 108. Moreover, and as illustrated, the layers (kerogen-rich or otherwise) may have varying thickness (e.g., thickness T1 of layer 102 compared to thickness T2 of layer 108).

Due in part to the deposition mechanism and in part to the deposited materials, present day porosity and permeability of shale is very low. For example, the number and size of interstitial spaces between grains of deposited minerals in shale, as well as the connectivity of such interstitial spaces, is very low compared to, for example, a sandstone. Moreover, the kerogen-rich layers of a layered shale formation have high kerogen content (again compared to, for example, sandstone), and thus the oil and gas production mechanisms differ from conventional reservoirs.

Modeling Flow of Hydrocarbons

At least some of the various embodiments are directed to modeling hydrocarbon production from a layered shale formation that is or will be penetrated by a wellbore. In accordance with at least some embodiments, a geological model is used that has previously been used for predicting hydrocarbon production from non-shale formations, such as high permeability sandstone. However, model parameters are selected and/or adjusted to account for use regarding a shale formation, and more particularly the model parameters are selected and/or adjusted to account for use regarding a layered shale formation.

Thus, an issue in using a geological model previously used for non-shale formations to, predict future hydrocarbon production from a layered shale formation is how to select a permeability and porosity to be used for each layer. More particularly, an issue is how to select various parameters for each kerogen-rich layer, and how to select various parameters for each kerogen-poor layer, such that the model better predicts future hydrocarbon production. The following table provides a high level overview of the source of particular parameters used in modeling the future hydrocarbon production.

TABLE 1

| Parameter | Kerogen-Rich Layer | Kerogen-Poor Layer |
| --- | --- | --- |
| Permeability | Micro-scale simulation | Log |
| Porosity | Estimated from vitrinite reflectivity | Log |

In particular, for each kerogen-poor layer, the permeability and porosity are determined based on physical log properties (e.g., determined by a logging tool run through a survey wellbore, or through other wellbores in proximity to the actual or planned path through the layered shale formation). The permeability used for each kerogen-rich layer is selected or determined based on a micro-scale simulation of the particular layer. The porosity used for each kerogen-rich layer is estimated based on kerogen-related porosity (derived based on basin geological modeling calibrated to a parameter such as vitrinite reflectivity) and water-wet porosity. The specification first turns to porosity estimation, and then to the micro-scale simulation to determine permeability for each kerogen-rich layer.

Kerogen-Related Porosity

Kerogen-related porosity refers to pore spaces within the kerogen grains of a kerogen-rich layer and to the associated micro-fractures. The pore spaces within the kerogen grains are not present at deposition of the organic material. Rather, the pore spaces in the kerogen grains are created over geologic time by subsidence, burial, and resultant heating. The pressure and temperature causes the organic matter to convert to liquid and gas hydrocarbon components. The conversion to liquid and gas hydrocarbon components creates a volume and related pressure increase, which thus causes microscopic fractures and expulsion of some of the oil and gas generated. Thus, "kerogen-related" in this context refers to the creation mechanism of the porosity, not the affinity for molecular interaction between the hydrocarbon molecules and the mineral molecules.

With the ultimate goal of modeling or simulating future hydrocarbon production from the kerogen-rich layers of the layered shale formation, an initial step is determining a value indicative of the kerogen-related porosity of a kerogen-rich layer of the layered shale formation. In accordance with various embodiments, the kerogen-related porosity may be estimated or calculated based on several underlying parameters. One such parameter is an indication of total organic content of a kerogen-rich layer of the layered shale formation. Many mechanisms exist to obtain an indication of total organic content of each layer of a layered shale formation. For example, by way of exploratory wellbores, core samples of the shale formation may be taken, and by way of laboratory analysis the kerogen content of each layer may be determined. In some embodiments, not only is the kerogen content determined (e.g., the overall percentage of kerogen of the rock), but also an indication of the different types of and relative concentrations of the different types of kerogen may be determined.

Referring again to FIG. 1, co-plotted with the cross-sectional elevation view of the layered shale formation 100 is a plot 120 illustrating an indication of total organic content (TOC) as a function of depth within the layered shale formation. In particular, the plot 120, deflects to the right in an amount proportional to the total organic content of each layer. For example, kerogen-poor layer 110 shows low total organic content at region 122 of the plot (less than 2% total organic content), while kerogen-rich layer 102 shows high total organic content at region 124 of the plot (2% or greater of total organic content). Plot 120 also illustrates that the total organic content as between kerogen-rich layers within a layered shale formation 100 may differ. For example, kerogen-rich layer 102 has higher total organic content (as shown by region 124 of the plot) than kerogen-rich layer 104 (as shown by region 126 of the plot).

Another parameter that may be used in the overall determination of kerogen-related porosity is vitrinite reflectivity or some other maturation-related indicator such as the level of organic maturity (LOM) or conodont reflectivity. In particular, vitrinite is a maceral present in kerogens that has a property that the vitrinite changes color as a function of the maximum temperature to which the vitrinite has been exposed. The "vitrinite reflectivity" thus refers to an indication of the maximum temperature to which the vitrinite (and thus the closely located kerogens) has been exposed over the course of geologic time. Another set of parameters that may be used in the overall determination of kerogen-related porosity is the burial history for the formation. Burial history for most present day shale formations is available to be modeled from a variety of sources.

The burial history (particularly, burial temperature) contributes in terms of activation temperatures of the kerogens. In particular, each kerogen type has a different activation temperature and expulsion rate. Activation temperature refers to the temperature at which the kerogen begins to produce hydrocarbons, and also to relative amounts of oil and as of the hydrocarbons produced (as a function of temperature). The expulsion rate is indicative of an amount of oil and gas that has been expelled and has migrated to other formations. For the reason of expulsion, in some cases shale formations are referred to as source reservoir rock—the shale sources hydrocarbons for other rock formations, such as sandstone.

Figure 2:
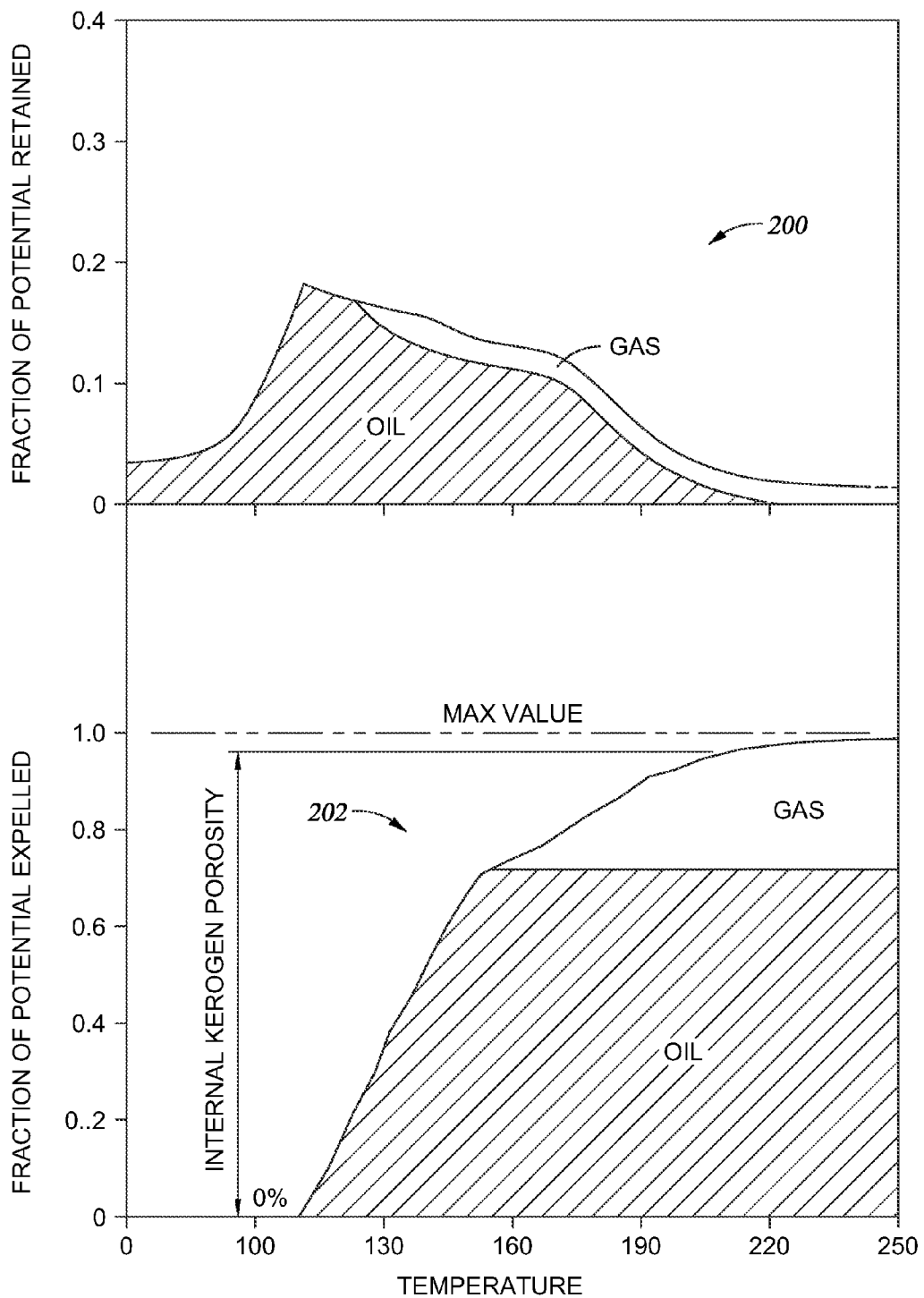
FIG. 2 shows graphs of expulsion and retention of hydrocarbons from a shale formation having a particular kerogen type, in order to explain calculating porosity of the kerogen.

FIG. 2 shows an illustrative set of related graphs (Pepper and Corvi 1995) showing relative amounts of hydrocarbons expelled and retained for a particular type of kerogen. In particular, the upper graph 200 shows an indication of hydrocarbons retained (Y axis) as a function of maximum temperature to which the kerogen was exposed (X axis), and the lower graph 202 shows an indication of hydrocarbons expelled (Y axis) as a function of maximum temperature to which the kerogen was exposed (X axis).

Referring initially to the lower graph 202, for the particular type of kerogen, oil is not expelled until the kerogen reaches about 115 degrees C. At temperatures above about 150 degrees C., the kerogen expels both oil and gas. If an illustrative maximum burial temperature of about 205 degrees C. is reached, the lower graph shows the fraction potential of expelled hydrocarbons is near its maximum. The fraction potential of expelled hydrocarbons for kerogen deposits is directly related to porosity due to the principle of conservation of mass. More particularly, when the fraction potential of expelled hydrocarbons for a kerogen is very high, the resultant porosity may be high as well, and in some cases as high as 30% depending on the type of kerogen. The Marcellus and Barnett shales, which for their kerogen types and burial history have reached or almost reached the maximum fraction potential of expelled hydrocarbons, have porosities in the range of about 20-25%. Each source rock shale has its individual characteristics and may be calibrated in the analysis. A recent example of this calibration shows that the maximum kerogen-related porosity in the Powder River Basin varies with the value of the initial total organic carbon (Modica and LaPierre, 2012).

The upper graph 200 of FIG. 2 illustratively shows the fraction of hydrocarbons retained by the kerogen as a function of maximum temperature. For the illustrative maximum temperature of 205 degrees C., about 2.0% of the hydrocarbons produced over geologic time remain, with more than half of the remaining hydrocarbon in the form of gas. It is the hydrocarbons retained in maturation which are being produced from shale formations present day.

Thus, in order to determine a kerogen-related porosity, the various embodiments may utilize an indication of the kerogen content, the vitrinite reflectivity, and the burial history. From this information an indication of the fraction potential of expelled hydrocarbons for each kerogen type may be determined. Based on the fraction potential of expelled hydrocarbons for each kerogen type, and in some cases the relative percentages of the kerogen types present in the formation, the kerogen-related porosity may be determined.

Figure 3A:
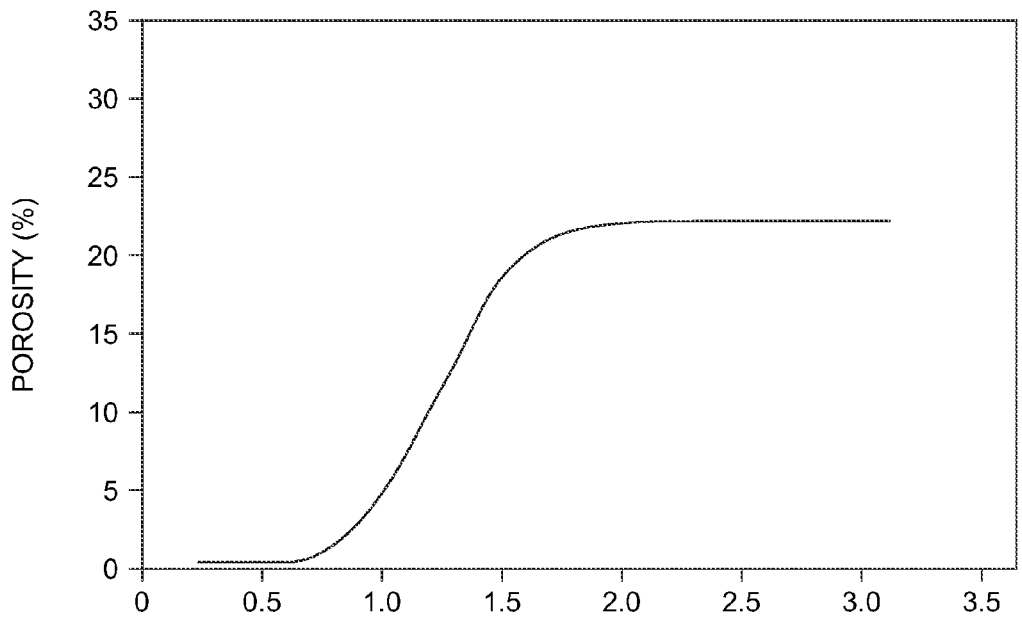
FIG. 3A shows a graph of an illustrative relationship between vitrinite reflectivity (Ro) and porosity, in accordance with at least some embodiments.

FIG. 3A shows a graph of an illustrative relationship between the maturation of the kerogen (expressed as the vitrinite reflectivity Ro, along the X axis) and kerogen-related porosity (along the Y axis). In particular, the current data of the inventors shows the depicted relationship between vitrinite reflectivity and kerogen-related porosity, with a steep curve between about 0.75 and 1.75 Ro, asymptotically approaching about 25% for higher values of Ro. This relationship will vary for each source rock and kerogen type. Although the inventors do not wish to be tied to any particular physical mechanism that relates expulsion to porosity, one possible correlation deals with volume. That is, as the hydrocarbons are produced and expelled, the volume previously occupied is left unoccupied, thus leading to the porosity. The specification now turns to water-wet porosity.

Water-Wet Porosity

Water-wet porosity refers to porosity associated with water initially deposited along with the organic material, clay material, and other minerals. The water occupies space in the deposited material that eventually contributes to the present-day porosity of the shale formation. Because of low permeability, in some cases the water may still be present within the water-wet porosity, but in other cases the water may have migrated elsewhere, for example, through fracture permeability caused by natural stresses in the formation. Thus, "water-wet porosity" in this context refers to the creation mechanism of the porosity, not the affinity for molecular interaction between the water molecules and the mineral molecules.

Figure 3B:
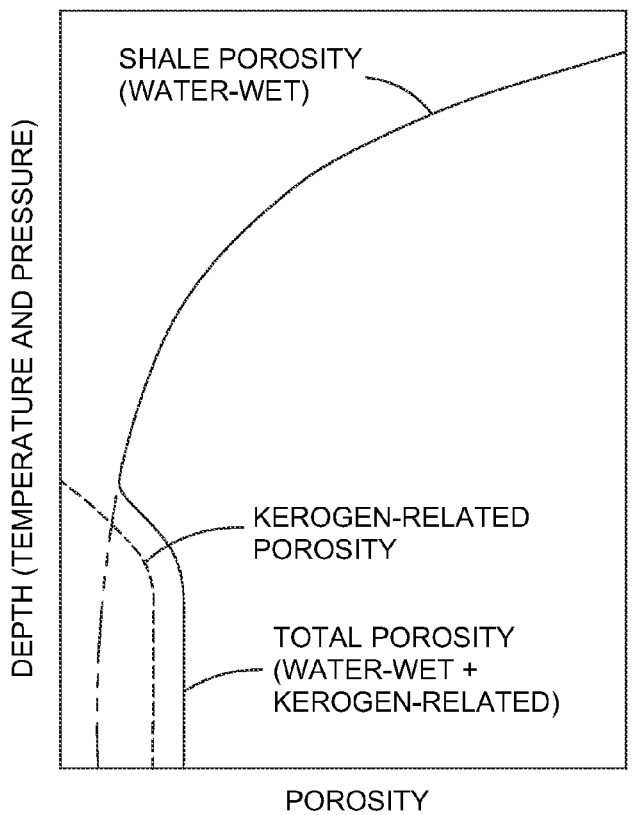
FIG. 3B shows a graph of an illustrative relationship between porosity and burial depth in accordance with at least some embodiments.

FIG. 3B shows the porosity loss with burial depth of the water-wet shale porosity due to compaction and fluid loss. The kerogen-related porosity is near zero at the time of burial and remains low until sufficient depth and temperature is reached for the generation and expulsion of hydrocarbons. At that depth and temperature, the kerogen-related porosity begins to increase proportionally with the volume of expelled hydrocarbons until a maximum value is reached. Therefore, the total porosity in the source rock reservoir initially decreases with increasing burial depth. Then at the time of hydrocarbon expulsion, the total porosity begins to increase with continued burial and heating until expulsion ceases.

In accordance with at least some embodiments, an indication of the water-wet porosity is obtained. In some cases, the indication of water-wet porosity is determined based on the kerogen-related porosity, and a total porosity. In particular, the total porosity of a kerogen-rich layer of the layered shale formation may be considered, for purposes of this disclosure, to be a combination of the water-wet porosity and the kerogen-related porosity, according to the following equation:

$$POR_{tot} = POR_{ww} + POR_{ker} \quad (1)$$

where $POR_{tot}$ is the total porosity of the layered shale formation, $POR_{ww}$ is the water-wet porosity for the kerogen-rich layer, and $POR_{ker}$ is the kerogen-related porosity for the kerogen-rich layer. The $POR_{ker}$ may be determined as discussed above in the section titled KEROGEN-RELATED POROSITY. The total porosity may be determined from several available sources. For example, Halliburton Energy Services, Inc. of Houston, Tex., provides a SHALELOG® service whereby several parameters of a shale formation are estimated and/or determined, such as total organic content of each layer within a layered shale formation, and total porosity of the shale formation. Thus, using the total porosity, the kerogen-related porosity, and equation (1) above, the water-wet porosity may be determined.

Micro-Scale Simulation

As discussed with respect to Table 1, in accordance with at least some embodiments a value of permeability for each kerogen-rich layer is determined based on a micro-scale simulation of a kerogen-rich layer. That is, taking into account types and number of kerogen particles within a kerogen-rich layer, a simulation is run to determine a value of permeability to be used in later macro-scale models. More particularly, in accordance with at least some embodiments the micro-scale simulation is based on a model volume on the order of cubic centimeter. By contrast, macro-scale models used to predict future hydrocarbon production may have model volumes on the order the physical size of the layered shale formation.

The micro-scale modeling philosophy may be based on several underlying assumptions. Firstly, in addition to the kerogen-related porosity and water-wet porosity, the shale formations are interlaced with a fracture network caused by geologic stresses, along with artificial fracturing from hydraulic fracture operations (where applicable), singly or collectively referred to as fracture porosity. The fracture network is assumed to have a porosity (i.e., the holes, in the rock formation) and permeability (i.e., how well a fluid moves through the porosity present). Secondly, for kerogen particles that do not abut fracture porosity, movement of hydrocarbons from the kerogen-related porosity to the fracture porosity is assumed to take place through micro-fractures created in the shale during expulsion of hydrocarbons in the distant geologic past. The flow through the kerogen-related porosity and/or the micro-fractures is statistical flow (i.e., non-Darcy flow). While the micro-fractures may have fluidly coupled to water-wet porosity in the past (and thus the water-wet porosity may contain commercially significant amounts of hydrocarbons), very small pore throat size for the micro-fractures (in some cases on the order of 5 nanometers), cementation, and/or diagenesis may make hydrocarbon flow pathways from the kerogen-related porosity to the fracture porosity separate and apart from continuum flow (i.e., Darcy-flow) pathways from water-wet porosity to the fracture porosity. One known indicator of whether continuum flow regime is applicable is the Knudsen number. At Knudsen number <0.001 (that is, larger pore diameters), continuum flow occurs and is described by Darcy or Darcy-type flow equations, but at larger Knudsen numbers (smaller pore diameters) the flow regimes are different and continuum flow equations do not apply well, and thus statistical methods may be used.

Next, even though the water-wet porosity may contain hydrocarbons, the water-wet porosity may be water-wet (in the affinity sense), and thus the hydrocarbon production mechanism for each system is different than the kerogen-related porosity, which may produce by diffusion flow. Finally then, in some embodiments the permeability associated with the kerogen-related porosity is assumed in the micro-scale simulation to be distinct from the permeability associated with the water-wet porosity.

Figure 4:
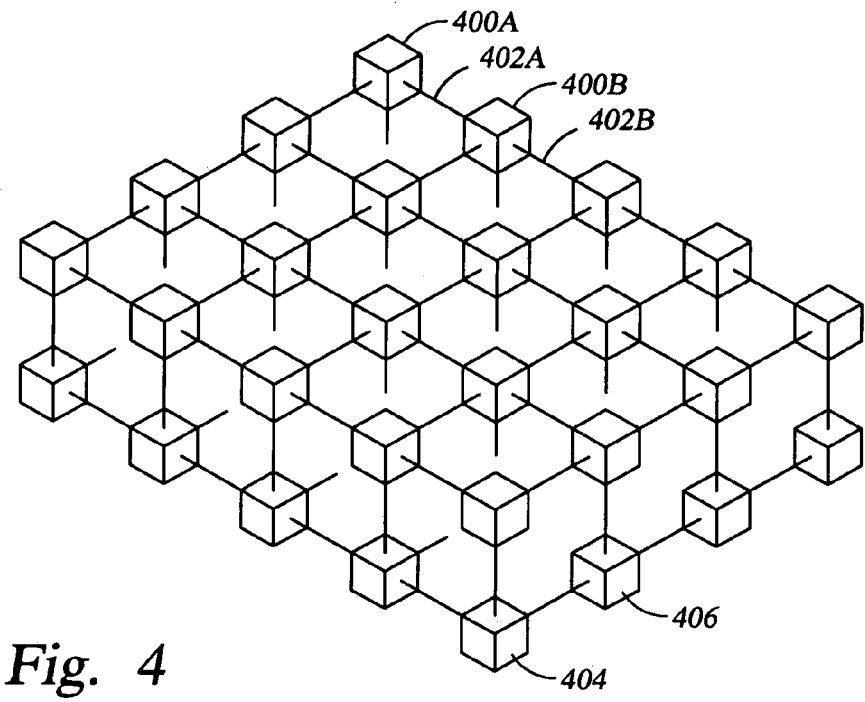
FIG. 4 shows a perspective view of grid structure for simulating hydrocarbon flow with respect to kerogen particles in accordance with at least some embodiments.

With the underlying assumptions in mind, the micro-scale simulation of the flow of hydrocarbons may be based on some or all the various porosities (and related permeabilities) discussed. In some cases, the kerogens are modeled as homogeneous kerogens on a lattice, as shown in FIG. 4. In particular, FIG. 4 illustratively shows a lattice having kerogen particles (e.g., 400A, 400B) interconnected by micro-fractures (e.g., 402A, 402B). While FIG. 4 shows only a two layer lattice so as not to unduly complicate the figure, multiple layers may be used for the micro-scale model. Moreover, while FIG. 4 illustrates only twenty kerogen particles on each layer (not all the kerogen particles of the second layer are not visible), greater or fewer kerogen particles may be included in the micro-scale simulation based on the relative density of kerogen particles in the particular kerogen-rich layer. Thus, a computer system executing a program may simulate hydrocarbon movement through and/or from the kerogen particles 400 (oil-wet in an affinity sense, and also having absorbed gas) through the micro-fractures 402 (which may be, in the affinity sense, either oil-wet or water-wet) to the fracture porosity (which fracture porosity is not specifically shown). The spacing and permeability of the fracture porosity may be determined any suitable way, such as core samples, or with respect to areas of the shale formation that have been hydraulically fractured from software programs that simulate the type and extent of hydraulic fracturing.

Separately accounting for the kerogen particles 300 and the micro-fractures 302 enables better predictive qualities for the micro-scale simulation. That is, hydrocarbons may be produced from the kerogens by different functionalities, and some or all of the functionalities may be modeled at the micro-scale level. For example, non-absorbed gas may be present in the kerogen-related porosity, and hydraulic fracturing may open flow pathways from the kerogen particles to the fracture porosity and ultimately to the borehole. Moreover, as the pressure within the kerogen-related porosity decreases, absorbed gas may be produced. Thus, both these illustrative production mechanisms may be simulated at the micro-scale to determine a macro-scale permeability to be used for later macro-scale models.

The illustration of FIG. 4 is based on homogenous kerogen particles evenly spaced throughout the micro-scale model volume, and micro-fractures 402 fluidly coupling the kerogen particles to their nearest neighbor kerogen particles and eventually to the fracture porosity. However, in other embodiments, the kerogen particles 400 may be separately modeled based on kerogen type. That is, for example, if analysis of the shale formation reveals three different kerogen types then the simulation regarding the layer may likewise comprise three different types of kerogen particles in proportions that substantially match the proportions of the actual kerogen particles of the particular kerogen-rich layer. For example, kerogen particle 404 may be modeled as a Type II kerogen, whereas kerogen particle 406 may be a Type III/IV kerogen, each kerogen type having a different internal porosity and different retained hydrocarbon types and volumes. Though one may know the different types of kerogens in a shale formation based on the various types of analysis, the precise layout of the different kerogen types may not be known, and thus a random distribution of the kerogen types through the lattice may be used.

Further still, the arrangement of the kerogen particles in the micro-scale model need not be regular as shown in FIG. 4. In particular, the layout of the kerogen particles (whether homogenous or comprising different, randomly selected types) in the micro-scale model volume may be irregularly spaced within the lattice. For example, a kerogen-rich layer, with lower total organic content (e.g., layer 104 of FIG. 1) may be modeled as a micro-scale model volume with irregularly spaced kerogen particles, to better simulate the hydrocarbon flow characteristics. Yet further still, the space between the kerogen particles may be modeled as well (i.e., matrix portions), with the matrix portions having a permeability (albeit small) that contributes to the macro-scale permeability determination. FIG. 4 does not show the matrix components so as not to unduly complicate the figure.

In some embodiments, the hydrocarbon flow pathways associated with the kerogen-related porosity and related micro-fractures (non-Darcy flow pathways) are assumed to be separate and distinct flow pathways from the water-wet porosity (Darcy flow) and that the separate flow pathways do not intermingle. Thus, until the hydrocarbons reach the fracture porosity, the flow through each system is separate. For these reasons, in some embodiments the two distinct systems are separately simulated for the same micro-scale model volume. FIG. 4 does not show the water-wet porosity so as not to unduly complicate the figure, but one having ordinary skill in the art now understanding the modeling of flow associated with the kerogen-related porosity, could implement micro-scale modeling of flow associated with the parallel water-wet porosity (e.g., water-wet in an affinity sense, no absorption) using knowledge of Darcy flow modeling techniques. Thus, there are four continua that may be explicitly simulated at the micro-scale in accordance with at least some embodiments; kerogen-related porosity (oil-wet in the affinity sense, containing absorbed gas); micro-fractures (that may be either oil-wet or water-wet in the affinity sense); water-wet porosity (water-wet in the affinity sense, and with no absorption); and fracture porosity.

Figure 5:
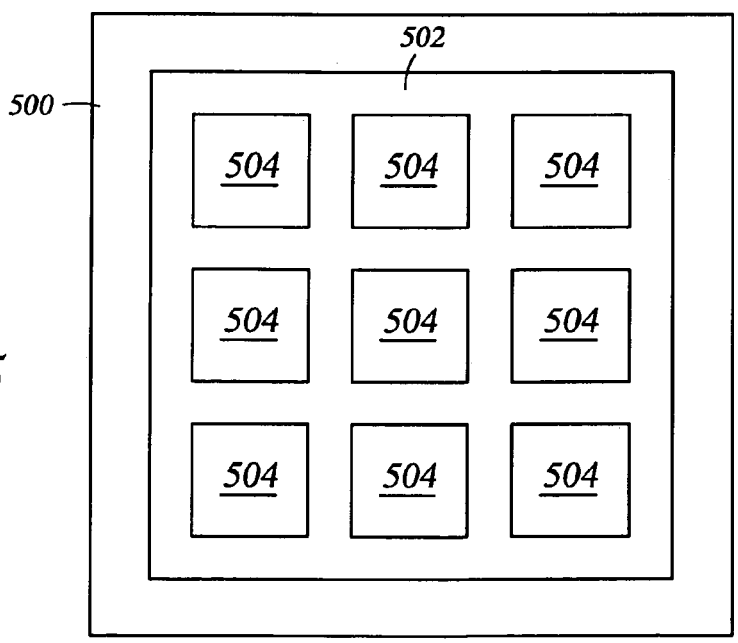
FIG. 5 shows a block diagram of simulating fracture porosity, kerogen-related porosity, and water-wet porosity in accordance with at least some embodiments.

FIG. 5 shows a block diagram structure to illustrate gridding the explicitly modeled continua at the micro-scale. In particular, FIG. 5 illustrates the fracture porosity and/or permeability (hereafter just fracture porosity 500) by way of outer portion of the block diagram. That is, fracture porosity 500 may be thought of as surrounding or encompassing the other components expressly modeled. The fracture porosity may be water- or oil-wet in affinity sense, and in most cases has high permeability. Bounded within the fracture porosity 500 is the kerogen-related porosity and/or permeability (hereafter just kerogen-related porosity 502). The contiguous portions associated with kerogen-related porosity 502 represent flow pathways through the kerogen-related porosity and/or the micro-fractures (not specifically shown). Again, the kerogen-related porosity 502 is in most cases oil-wet in an affinity sense, gas filled, and comprises absorbed gas in the pores of the kerogen. Finally, bounded within the fracture porosity 500 is the water-wet porosity and/or permeability (hereafter just water-wet porosity 504). While shown as bounded exclusively by the kerogen-related porosity 502, the water-wet porosity 504 may likewise abut both kerogen-related porosity 502 and the fracture porosity 500. The portions associated with water-wet porosity 504 represent flow pathways through the water-wet porosity. Again, the water-wet porosity 404 is in most cases water-wet in an affinity sense, may be gas filled, and has Darcy flow.

The kerogen-related porosity may have non-absorbed gas (which is produced through the micro-fractures), but the kerogen-related porosity may also have absorbed gas within the kerogen particle structure. Thus, in at least some embodiments, simulating at the micro-scale takes into account not only the non-absorbed gas, but also absorbed gas freed by decreasing pore pressure. The phenomenon is characterized by the Langmuir Equation (also known as the Langmuir Isotherms).

From the micro-scale simulation, the hydrocarbon movement through the kerogen-rich layer may be modeled, and based on the micro-scale model a macro-scale permeability is determined, which permeability may be used in later macro-scale models to predict hydrocarbon production. More particularly, at the micro-scale there are a plurality of permeabilities to be considered (e.g., non-Darcy flow through kerogen-related porosity and microfractures, and Darcy-flow from the water-wet porosity), along with a plurality of production mechanisms (e.g., non-absorbed gas, absorbed gas), all of which contribute in varying degrees to a macro-scale permeability to be used in later macro-scale modeling.

Figure 6:
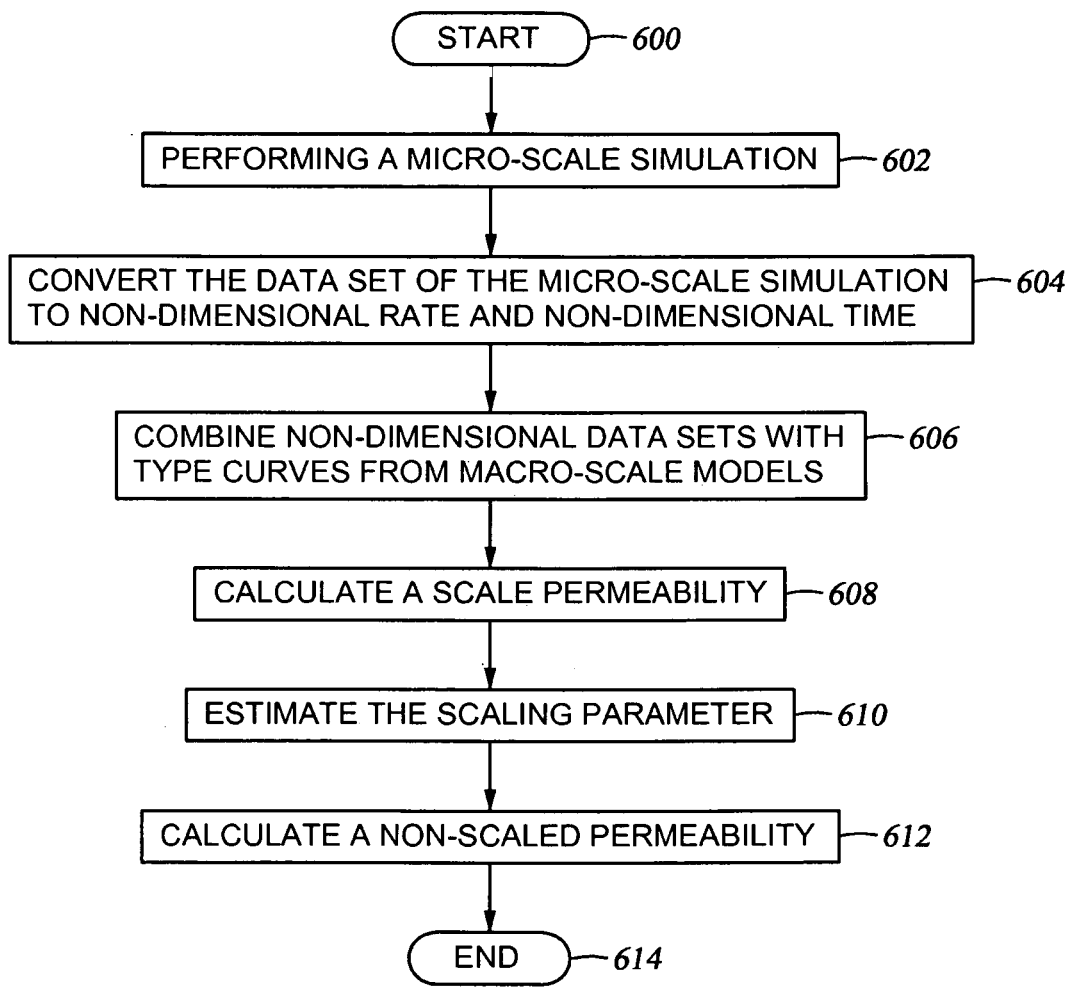
FIG. 6 shows a method in accordance with at least some embodiments.

FIG. 6 shows a method of determining a macro-scale permeability based on micro-scale simulations. In particular, the method starts (block 600) and moves to performing a micro-scale simulation (block 602). The micro-scale simulation, taking into account the issues noted above, produces a hydrocarbon production rate versus time data set, and produces pressure versus time data set. The illustrative method then proceeds to convert the data sets to non-dimensional rate and non-dimensional time (block 604). The non-dimensional data sets are combined (e.g. plotted) with type curves from macro-scale models (block 606). That is, a plurality of macro-scale models are run with respect to a generic formation, each macro-scale model run with varying parameters (e.g., varying time, porosity, permeability, reservoir width, reservoir length, bottom hole pressure, etc.). From the varying macro-scale models a family of data sets is created (i.e., a family of curves is created). However, by rescaling units (e.g., using a combination of time, length, porosity, and permeability), the family of curves collapse to single curve—a type curve.

The illustrative method then proceeds to calculate a scaled permeability $k*phi$, where phi is the scaling and k is permeability) by curve fitting the non-dimensional data set to the type curve (block 608). Based on the curve fitting, an estimate of the scaling parameter phi may be determined (block 610). Once phi is determined, the method proceeds to calculate a non-scaled permeability (block 612), which non-scaled permeability is the macro-scale permeability to be used in the macro-scale models. Thereafter the methods ends (block 614). It is noted that the method associated with FIG. 6 is merely illustrative of determining a permeability to be used in macro-scale models from the micro-scale simulations. One having ordinary skill in the art, now understanding in view of this disclosure the idea of determining a macro-scale permeability based on permeabilities simulated at the micro-scale, may devise other methods to derive a macro-scale permeability from micro-scale simulations that fall within the scope of the appended claims. Once a macro-scale permeability for each kerogen-rich layer is determined, production from the layered shale formation may be modeled at the macro-scale.

Macro-Scale Model

Once a macro-scale permeability for each kerogen-rich layer is determined, the various embodiments turn to modeling the hydrocarbon production from the layered shale formation—the macro-scale model. In particular, parameters of the macro-scale model are populated as discussed in Table 1 above. That is, for each kerogen-rich layer a porosity and permeability are used, with the permeability as determined from the micro-scale model. Likewise, for each kerogen-poor layer a porosity and permeability are used as determined from logging operations. Based on the parameters selected, the macro-scale model may be used to predict future hydrocarbon production over any relevant period of time.

In some cases, the macro-scale model operates by modeling the same transport mechanism both in the kerogen-rich layers and kerogen-poor layers. For example, in some cases the transport mechanism utilized is Darcy flow in both kerogen-rich layers and the kerogen-poor layers, in spite of the fact that the transport mechanism in at least a portion of the kerogen-rich layers is non-Darcy flow. In yet still other cases, however, the macro-scale model is modified to use a different transport mechanism in the kerogen-rich layers than in the kerogen-poor layers. For example, in some embodiments the macro-scale model may be modified to use a statistical mechanics flow regime (e.g., Knudsen flow) in kerogen-rich layers, while using continuum mechanism flow regime (e.g., Darcy flow) in kerogen-poor layers. Such a modification may result in better hydrocarbon predictive abilities than using Darcy flow independent of the layer modeled.

Figure 7:
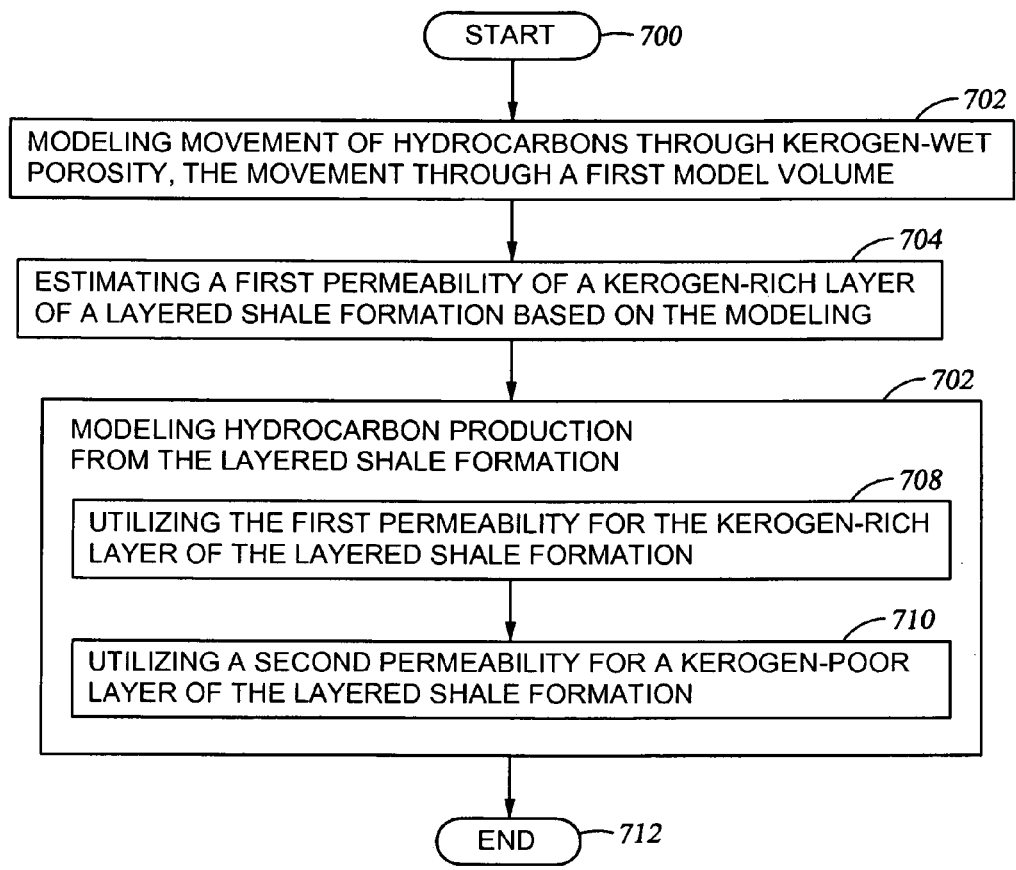
FIG. 7 shows a method in accordance with at least some embodiments.

FIG. 7 shows a method (which may be implemented by computer system) in accordance with at least some embodiments. In particular, the method starts (block 700) and proceeds to modeling movement of hydrocarbons through kerogen-related porosity, the movement through a first model volume (block 702). Thereafter, the method may comprise estimating a first permeability of a kerogen-rich layer of a layered shale formation based on the modeling (block 704). Once a permeability is determined, the method may comprise modeling hydrocarbon production from the layered shale formation (block 706). The modeling hydrocarbon production may be by: utilizing the first permeability for the kerogen-rich layer of the layered shale formation (block 708); and utilizing a second permeability for a kerogen-poor layer of the layered shale formation (block 710). In some cases, the modeling of hydrocarbon production is with respect to a second model volume greater than the first model volume. Thereafter, the method ends (block 712).

Figure 8:
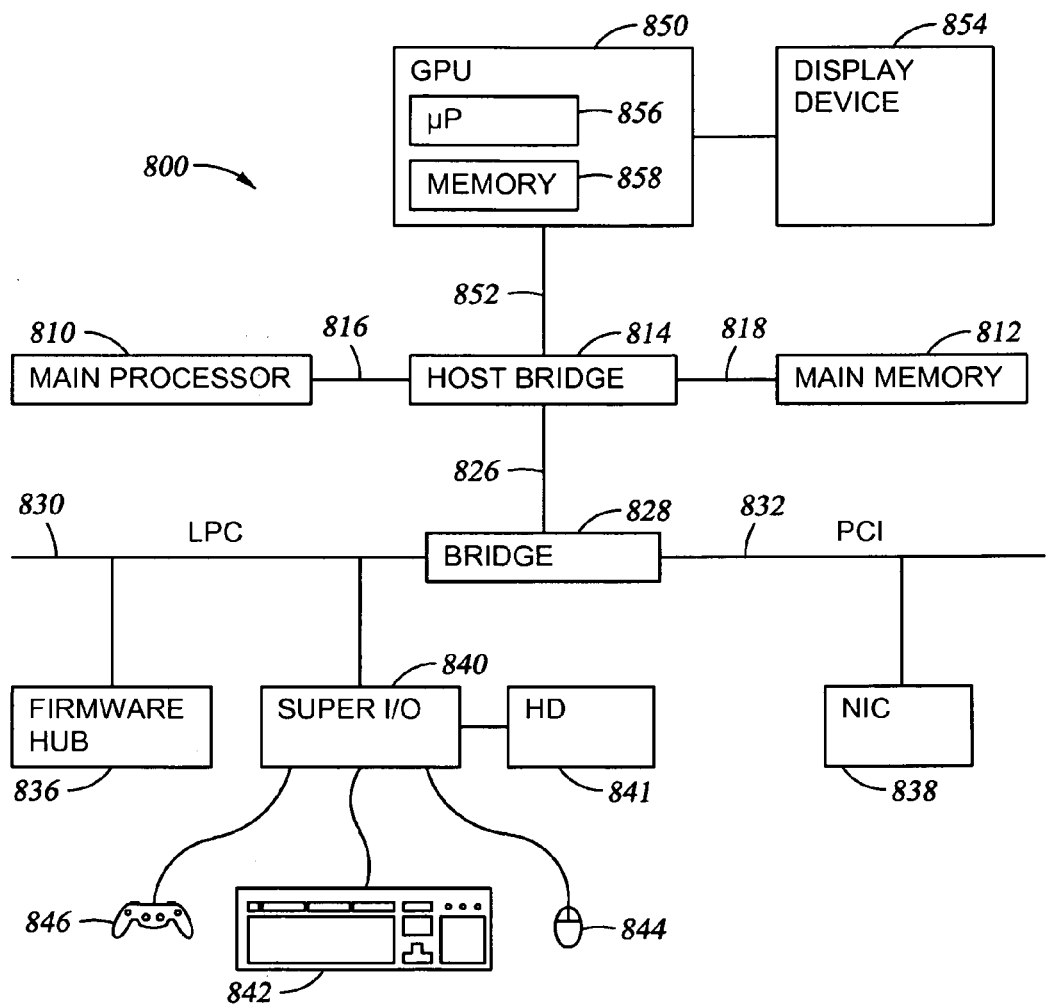
FIG. 8 shows a computer system in accordance with at least some embodiments.

FIG. 8 illustrates a computer system 800 in accordance with at least some embodiments. In particular, computer system 800 comprises a main processor 810 coupled to a main memory array 812, and various other peripheral computer system components, through integrated host bridge 814. The main processor 810 may be a single processor core device, or a processor implementing multiple processor cores. Furthermore, computer system 800 may implement multiple main processors 810. The main processor 810 couples to the host bridge 814 by way of a host bus 816, or the host bridge 814 may be integrated into the main processor 810. Thus, the computer system 800 may implement other bus configurations or bus-bridges in addition to, or in place of, those shown in FIG. 8.

The main memory 812 couples to the host bridge 814 through a memory bus 818. Thus, the host bridge 814 comprises a memory control unit that controls transactions to the main memory 812 by asserting control signals for memory accesses. In other embodiments, the main processor 810 directly implements a memory control unit, and the main memory 812 may couple directly to the main processor 810. The main memory 812 functions as the working memory for the main processor 810 and comprises a memory device or array of memory devices in which programs, instructions and data are stored. The main memory 812 may comprise any suitable type of memory such as dynamic random access memory (DRAM) or any of the various types of DRAM devices such as synchronous DRAM (SDRAM), extended data output DRAM (EDODRAM), or Rambus DRAM (RDRAM). The main memory 812 is an example of a non-transitory computer-readable medium storing programs and instructions, and other examples are disk drives and flash memory devices.

The illustrative computer system 800 also comprises a second bridge 828 that bridges the primary expansion bus 826 to various secondary expansion buses, such as a low pin count (LPC) bus 830 and peripheral components interconnect (PCI) bus 832. Various other secondary expansion buses may be supported by the bridge device 828.

Firmware hub 836 couples to the bridge device 828 by way of the LPC bus 830. The firmware hub 836 comprises read-only memory (ROM) which contains software programs executable by the main processor 810. The software programs comprise programs executed during and just after power on self test (POST) procedures as well as memory reference code. The POST procedures and memory reference code perform various functions within the computer system before control of the computer system is turned over to the operating system. The computer system 800 further comprises a network interface card (NIC) 838 illustratively coupled to the PCI bus 832. The NIC 838 acts to couple the computer system 800 to a communication network, such the Internet, or local- or wide-area networks.

Still referring to FIG. 8, computer system 800 may further comprise a super input/output (I/O) controller 840 coupled to the bridge 828 by way of the LPC bus 830. The Super I/O controller 840 controls many computer system functions, for example interfacing with various input and output devices such as a keyboard 842, a pointing device 844 (e.g., mouse), a pointing device in the form of a game controller 846, various serial ports, floppy drives and disk drives. The super I/O controller 840 is often referred to as "super" because of the many I/O functions it performs.

The computer system 800 may further comprise a graphics processing unit (GPU) 850 coupled to the host bridge 814 by way of bus 852, such as a PCI Express (PCI-E) bus or Advanced Graphics Processing (AGP) bus. Other bus systems, including after-developed bus systems, may be equivalently used. Moreover, the graphics processing unit 850 may alternatively couple to the primary expansion bus 826, or one of the secondary expansion buses (e.g., PCI bus 832). The graphics processing unit 850 couples to a display device 854 which may comprise any suitable electronic display device upon which any image or text can be plotted and/or displayed. The graphics processing unit 850 may comprise an onboard processor 856, as well as onboard memory 858. The processor 856 may thus perform graphics processing, as commanded by the main processor 810. Moreover, the memory 858 may be significant, on the order of several hundred megabytes or more. Thus, once commanded by the main processor 810, the graphics processing unit 850 may perform significant calculations regarding graphics to be displayed on the display device, and ultimately display such graphics, without further input or assistance of the main processor 810.

Thus, it is upon illustrative computer system 800 that the various modeling and simulations discussed above may be performed. Moreover, the modeling and/or simulation may be performed, by a host of computer systems, such as computer system 800, operated in a parallel fashion. The results of the modeling and/or simulation may be shown the display device 854, and manipulated and/or explored by any of the user interface devices.

It is noted that while theoretically possible to perform some or all the calculations, simulations, and/or modeling by a human using only pencil and paper, the time measurements for human-based performance of such tasks may range from man-days to man-years, if not more. Thus, this paragraph shall serve as support for any claim limitation now existing, or later added, setting forth that the period of time to perform any task described herein less than the time required to perform the task by hand, less than half the time to perform the task by hand, and less than one quarter of the time to perform the task by hand, where "by hand" shall refer to performing the work using exclusively pencil and paper.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments, and/or to create a non-transitory computer-readable storage medium (i.e., other than an signal traveling along a conductor or carrier wave) for storing a software program to implement the method aspects of the various embodiments.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer-implemented method comprising:
    simulating, by a computer system, movement of hydrocarbons through a micro-scale model of a kerogen-rich layer of a layered shale formation;
    determining, by the computer system, a permeability of the kerogen-rich layer of the layered shale formation based on the simulation through the micro-scale model;
    determining, by the computer system, a permeability of a kerogen-poor layer of the layered shale formation based on a well log obtained for the layered shale formation;
    adjusting, by the computer system, parameters of a macro-scale model for use with the layered shale formation, based on the respective permeabilities of the kerogen-rich and kerogen-poor layers of the layered shale formation; and
    predicting hydrocarbon production for drilling a wellbore within the layered shale formation, based on the adjusted parameters of the macro-scale model.

2. The method of claim 1, wherein:
    the micro-scale model represents a kerogen-related porosity and a water-wet porosity of the kerogen-rich layer of the layered shale formation;
    simulating movement of hydrocarbons further comprises simulating movement of hydrocarbons through the kerogen-related porosity and the water-wet porosity of the kerogen-rich layer as represented by the micro-scale model; and
    determining the permeability of the kerogen-rich layer further comprises determining the permeability of the kerogen-rich layer based on the simulation through the kerogen-related porosity and the water-wet porosity.

3. The method of claim 2, wherein:
    the kerogen-rich layer is one of a plurality of kerogen-rich layers represented by the micro-scale model for the layered shale formation;
    simulating movement of hydrocarbons further comprises estimating the kerogen-related porosity for each of the plurality of kerogen-rich layers, based on a corresponding vitrinite reflectivity of that kerogen-rich layer, and simulating movement of hydrocarbons through the estimated kerogen-related porosity and the water-wet porosity of each of the plurality of kerogen-rich layers represented by the micro-scale model;
    determining the permeability of the kerogen-rich layer further comprises determining the permeability for each of the plurality of kerogen-rich layers of the layered shale formation based on the simulation; and
    the parameters of the macro-scale model are adjusted based on the permeability of the kerogen-poor layer and the permeability determined for each of the plurality of kerogen-rich layers of the layered shale formation.

4. The method of claim 1, wherein the parameters of the macro-scale model are adjusted so as to model hydrocarbon transport in the kerogen-rich layer and the kerogen-poor layer of the layered shale formation.

5. The method of claim 4, wherein the hydrocarbon transport in the kerogen-rich layer is modeled using a first transport mechanism, and the hydrocarbon transport in the kerogen-poor layer is modeled using a second transport mechanism that is different from the first transport mechanism.

6. The method of claim 5, wherein the first transport mechanism is a statistical mechanics flow regime based on non-Darcy or Knudsen flow, and the second transport mechanism is a continuum mechanics flow regime based on Darcy flow.

7. The method of claim 4, wherein the hydrocarbon transport in both the kerogen-rich layer and the kerogen-poor layer of the layered shale formation are modeled using a continuum mechanics flow regime based on Darcy flow.

8. The method of claim 1, wherein the method further comprises:
    planning, by the computer system, a path of the wellbore through the layered shale formation, based on the predicted hydrocarbon production.

9. The method of claim 8 wherein prior to adjusting the parameters, the macro-scale model was used to predict hydrocarbon production from non-shale formations.

10. A computer system comprising:
    a processor;
    a display device coupled to the processor; and
    a memory coupled to the processor, the memory storing a program that, when executed by the processor, causes the processor to:
    simulate hydrocarbon movement through a micro-scale model of a kerogen-rich layer of a layered shale formation;
    determine a permeability for the kerogen-rich layer of the layered shale formation, based on the simulation through the micro-scale model;
    determine a permeability for a kerogen-poor layer of the layered shale formation based on a well log obtained for the layered shale formation;
    adjust parameters of a macro-scale model for use with the layered shale formation, based on the respective permeabilities of the kerogen-rich and kerogen-poor layers of the layered shale formation;
    predict hydrocarbon production for drilling a wellbore within the layered shale formation based on the adjusted parameters of the macro-scale model; and
    display on the display device an indication of the predicted hydrocarbon production from the layered shale formation.

11. The computer system of claim 10, wherein the micro-scale model represents a kerogen-related porosity of the kerogen-rich layer of the layered shale formation, and the program further causes the processor to:

simulate hydrocarbon movement through the kerogen-related porosity represented by the micro-scale model; and
determine the permeability of the kerogen-rich layer based on the simulation.

12. The computer system of claim 11, wherein the micro-scale model further represents a water-wet porosity of the kerogen-rich layer of the layered shale formation, and when the processor simulates, the program further causes the processor to:
simulate hydrocarbon movement through the kerogen-related porosity and the water-wet porosity of the kerogen-rich layer as represented by the micro-scale model; and
determine the permeability based on the simulated hydrocarbon movement through the kerogen-related porosity and the water-wet porosity.

13. The computer system of claim 12, wherein the kerogen-rich layer is one of a plurality of kerogen-rich layers represented by the micro-scale model for the layered shale formation, and when the processor simulates, the program further causes the processor to:
simulate hydrocarbon movement through the kerogen-related porosity and the water-wet porosity of each of the plurality of kerogen-rich layers of the layered shale formation, based on the micro-scale model;
determine the permeability for each of the plurality of kerogen-rich layers of the layered shale formation based on the simulated hydrocarbon movement through the kerogen-related porosity and the water-wet porosity of each kerogen-rich layer; and
adjust the parameters of the macro-scale model, based on the first permeability determined for each of the plurality of kerogen-rich layers and the second permeability determined for the kerogen-poor layer of the layered shale formation.

14. The computer system of claim 13, wherein the program further causes the processor to estimate the kerogen-related porosity of each of the plurality of kerogen-rich layers, based on a corresponding vitrinite reflectivity of the particular kerogen-rich layer of the layered shale formation.

15. The computer system of claim 10, wherein the parameters of the macro-scale model are adjusted so as to model hydrocarbon transport in the kerogen-rich layer and the kerogen-poor layer of the layered shale formation.

16. The computer system of claim 15, wherein the hydrocarbon transport in the kerogen-rich layer is modeled using a statistical mechanics flow regime based on non-Darcy flow, and the hydrocarbon transport in the kerogen-poor layer is modeled using a continuum mechanics flow regime based on Darcy flow.

17. The computer system of claim 15, wherein the hydrocarbon transport in both the kerogen-rich layer and the kerogen-poor layer of the layered shale formation are modeled using a continuum mechanics flow regime based on Darcy flow.

18. The computer system of claim 10, wherein the program further causes the processor to:
plan a path of the wellbore through the layered shale formation, based on the predicted hydrocarbon production.

19. A non-transitory computer-readable medium storing a program that, when executed by a processor, causes the processor to:
simulate hydrocarbon movement through a micro-scale model of a kerogen-rich layer of a layered shale formation;
determine a permeability for the kerogen-rich layer of the layered shale formation, based on the simulation through the micro-scale model;
determine a permeability for a kerogen-poor layer of the layered shale formation based on a well log obtained for the layered shale formation;
adjust parameters of a macro-scale model for use with the layered shale formation, based on the respective permeabilities of the kerogen-rich and kerogen-poor layers of the layered shale formation; and
predict hydrocarbon production for drilling a wellbore within the layered shale formation, based on the adjusted parameters of the macro-scale model.

20. The non-transitory computer-readable medium of claim 19, wherein the micro-scale model represents a kerogen-related porosity of the kerogen-rich layer of the layered shale formation, and the program further causes the processor to:
simulate hydrocarbon movement through the kerogen-related porosity represented by the micro-scale model; and
determine the permeability of the kerogen-rich layer based on the simulation.

21. The non-transitory computer-readable medium of claim 20, wherein the micro-scale model further represents a water-wet porosity of the kerogen-rich layer of the layered shale formation, and when the processor simulates, the program further causes the processor to:
simulate hydrocarbon movement through the kerogen-related porosity and the water-wet porosity of the kerogen-rich layer as represented by the micro-scale model; and
determine the permeability based on the simulated hydrocarbon movement through the kerogen-related porosity and the water-wet porosity.

22. The non-transitory computer-readable medium of claim 21, wherein the kerogen-rich layer is one of a plurality of kerogen-rich layers represented by the micro-scale model for the layered shale formation, and when the processor simulates, the program further causes the processor to:
simulate hydrocarbon movement through the kerogen-related porosity and the water-wet porosity of each of the plurality of kerogen-rich layers of the layered shale formation, based on the micro-scale model;
determine the permeability for each of the plurality of kerogen-rich layers of the layered shale formation based on the simulated hydrocarbon movement through the kerogen-related porosity and the water-wet porosity of each kerogen-rich layer; and
adjust the parameters of the macro-scale model, based on the permeability determined for each of the plurality of kerogen-rich layers and the permeability determined for the kerogen-poor layer of the layered shale formation.

23. The non-transitory computer-readable medium of claim 22, wherein the program further causes the processor to estimate the kerogen-related porosity of each of the plurality of kerogen-rich layers, based on a corresponding vitrinite reflectivity of the particular kerogen-rich layer of the layered shale formation.

24. The non-transitory computer-readable medium of claim 19, wherein the parameters of the macro-scale model are adjusted so as to model hydrocarbon transport in the kerogen-rich layer and the kerogen-poor layer of the layered shale formation.

25. The non-transitory computer-readable medium of claim 24, wherein the hydrocarbon transport in the kerogen-rich layer is modeled using a statistical mechanics flow regime based on non-Darcy flow, and the hydrocarbon transport in the kerogen-poor layer is modeled using a continuum mechanics flow regime based on Darcy flow.

26. The non-transitory computer-readable medium of claim 24, wherein the hydrocarbon transport in both the kerogen-rich layer and the kerogen-poor layer of the layered shale formation are modeled using a continuum mechanics flow regime based on Darcy flow.

27. The non-transitory computer-readable medium of claim 19, wherein the program further causes the processor to:
plan a path of a wellbore through the layered shale formation, based on the predicted hydrocarbon production.

28. A computer-implemented method comprising:
simulating, by a computer system, movement of hydrocarbons through a micro-scale model representing a kerogen-rich layer of a layered shale formation;
determining, by the computer system, a permeability of the kerogen-rich layer of the layered shale formation based on the simulation through the micro-scale model;
determining, by the computer system, a permeability of a kerogen-poor layer of the layered shale formation based on a well log obtained for the layered shale formation;
modeling, by the computer system, hydrocarbon production from the layered shale formation, based on the permeability of the kerogen-rich layer of the layered shale formation and the permeability of the kerogen-poor layer of the layered shale formation; and
planning, by the computer system, a path of a wellbore to be drilled through the layered shale formation, based on the modeled hydrocarbon production.

29. The method of claim 28, wherein modeling hydrocarbon production comprises:
adjusting parameters of a macro-scale model for use with the layered shale formation, based on the first and second permeabilities determined for the respective kerogen-rich and kerogen-poor layers of the layered shale formation; and
predicting hydrocarbon production from the layered shale formation based on the adjusted parameters of the macro-scale model.

* * * * *